United States Patent [19]

Tanino et al.

[11] Patent Number: 4,567,028

[45] Date of Patent: Jan. 28, 1986

[54] PROCESS FOR THE PREPARATION OF PHOSPHONITRILE CHLORIDE OLIGOMER

[75] Inventors: Hiroshi Tanino, Hasuda; Tetsuhiko Okamoto; Shinichiro Ueyama, both of Tokyo, all of Japan

[73] Assignee: Shin Nisso Kako Co., Ltd., Tokyo, Japan

[21] Appl. No.: 700,663

[22] Filed: Feb. 11, 1985

[30] Foreign Application Priority Data

Feb. 24, 1984 [JP] Japan .................................. 59-32525

[51] Int. Cl.$^4$ ............................................. C01B 25/10
[52] U.S. Cl. .................................................... 423/300
[58] Field of Search ......................................... 423/300

[56] References Cited

U.S. PATENT DOCUMENTS 2,788,286 4/1957 Teja et al. ............................ 423/302
4,157,425 6/1979 Dieck et al. ......................... 423/300
4,248,845 2/1981 Kinoshita et al. ................... 423/300
4,256,715 3/1981 Kinoshita et al. ................... 423/300
4,382,914 5/1983 Horie et al. ......................... 423/300

*Primary Examiner*—John Doll
*Assistant Examiner*—Wayne A. Langel
*Attorney, Agent, or Firm*—Lowe, King, Price & Becker

[57] ABSTRACT

A process for the preparation of phosphonitrile chloride oligomer, particularly, phosphonitrile chloride trimer at a high yield while suppressing the by-production of phosphonitrile chloride tetramer by reacting phosphorus pentachloride and ammonium chloride in an inert organic solvent under the presence of a polyvalent metal compound catalyst, wherein a catalytic amount of a compound selected from the group consisting of pyridine and alkyl-substituted pyridine derivatives capable of forming chloropyridinium salts in reaction with phosphorus pentachloride is present in the reaction system.

12 Claims, No Drawings

PROCESS FOR THE PREPARATION OF PHOSPHONITRILE CHLORIDE OLIGOMER

BACKGROUND OF THE INVENTION

1. Field of the Invention

The present invention concerns a process for the preparation of a phosphonitrile chloride oligomer mixture from phosphorus pentachloride and ammonium chloride and, more specifically, it relates to a process for preparing phosphonitrile chloride trimer at a high yield while significantly suppressing the by-production of a cyclic tetramer.

2. Description of the Prior Art

Phosponitrile chloride oligomer can generally be represented by the formula:

$$(NPCl_2)_n \qquad (I)$$

where n represents an integer of 3 or greater, and have attracted attention as an industrial material since many of the derivatives and polymers thereof have excellent properties in heat resistance, cold resistance, inflammability, electric insulation and the like. Among the above oligomers, a cyclic phosphonitrile chloride trimer of the above-mentioned formula (I) in which n=3 (hereinafter abbreviated as "3PNC") has a particularly wide range of use and thus is in greatest demand. Accordingly, it has been desired to produce 3PNC with a high yield and a high purity. However, a reaction process for preparing 3PNC alone is not yet known and 3PNC has always been obtained in the form of a mixture with various kinds of oligomers in the conventional production process for phosphonitrile chloride. Accordingly, it has been attempted so far for the production of 3PNC to improve the reaction yield in the entire mixture of phosphonitrile chloride oligomers as well as increase the ratio of 3PNC formed therein. Several examples of such processes of the prior art are given below.

(1) A process for reacting phosphorus pentachloride and ammonium chloride under the presence of a quinoline as the catalyst in a solvent of tetrachloroethane is disclosed in U.S. Patent Specification No. 2,788,286. Although it has been described therein that 3PNC and the heptamer can be obtained with no substantial formation of the tetramer (hereinafter abbreviated occasionally as "4PNC"), the reaction yield is low in the cited process.

(2) Japanese Patent Laid-Open Nos. 3705/1982 and 77012/1982 disclose a process of reacting phosphorus pentachloride and ammonium chloride under the presence of a polyvalent metal compound catalyst, washing a solution of the reaction product in an aliphatic hydrocarbon or an ether with water and recovering a product containing cyclic phosphonitrile chloride oligomers at a high content. Although the yield for 3PNC in this process is relatively high, the process has disadvantages in that the content of 4PNC in the reaction product is high before washing with water and that it takes a long period of time for the reaction.

(3) Japanese Patent Publication No. 19604/1983 proposes a process for reacting phosphorus trichloride with chlorine to form phosphorus pentachloride, and reacting the thus formed phosphorus pentachloride with ammonium chloride under the presence of a polyvalent metal compound to produce a phosphonitrile chloride oligomer mixture. However, this publication mentions nothing concerning the individual formation rates for 3PNC and 4PNC.

SUMMARY OF THE INVENTION

It is an object of the present invention to provide a process for preparing a phosphonitrile chloride oligomer mixture with a high content for 3PNC having the greatest demand, with a low content for 4PNC, which is difficult to isolate from 3PNC and thus causes trouble in producing a pure 3PNC product.

Another object of the present invention is to provide a process for preparing a phosphonitrile chloride oligomer mixture containing more than 65% of 3PNC and less than 10% of 4PNC.

The present invention concerns a process for preparing a phosphonitrile chloride oligomer mixture with a high 3PNC content and a low 4PNC content, wherein a catalytic amount of pyridine or an alkyl-substituted pyridine derivative capable of forming a chloropyridinium salt in reaction with phosphorus pentachloride is added to a system in which phosphorrus pentachloride, ammonium chloride and a polyvalent metal compound are present in an inert organic solvent and they were reacted under heating.

DETAILED DESCRIPTION OF THE INVENTION

Inert Organic Solvent

The inert organic solvent usable in the process according to the present invention is any of inert organic solvents conventionally known so far for preparing of phosphonitrile chloride oligomer from phosphorus pentachloride and ammonium chloride. They include, for example, tetrachloroethane, tetrachloroethylene, monochlorobenzene, dichlorobenzene and nitrobenzene, among which tetrachloroethane and monochlorobenzene are preferable.

The solvent is used in an amount sufficient to enable the reaction system to be stirred uniformly and from 2 to 5 ml of the solvent per gram of phosphorus pentachloride is advantageously used. If the amount of the solvent used is insufficient, it will cause a difficulty in stirring, while on the other hand an excess amount of the solvent may retard the reaction rate as well as result in an economic disadvantage.

Ratio of Reactant

In the present invention, it is preferred to use ammonium chloride in excess of an equimolar amount relative to phosphorus pentachloride and, usually, 1.1–1.5 mol of ammonium chloride are used per one mol of phosphorus pentachloride. If the amount of ammonium chloride is lower than the above-specified range, phosphorus pentachloride may remain partially unreacted, while on the other hand no further substantial effects can be obtained if the amount is in excess of the above specified range.

Polyvalent Metal Compound

The polyvalent metal compound usable in the process according to the present invention is any of those polyvalent metal compounds employed in the known processes for preparing a phosphonitrile chloride oligomer mixture from phosphorus pentachloride and ammonium chloride. As such polyvalent metal compounds, compounds of metals capable of acting as Lewis acid are effective. Examples of such metals are zinc, magnesium, tin, titanium, boron, aluminum, iron, cobalt, nickel, manganese, chromium and molybdenum. As the forms of the compounds, oxides, hydroxides, carbonates and organic acid salts that can be converted into chlorides with hydrogen chloride, chlorides, sulfates and nitrates can be mentioned.

In addition to the compounds mentioned above, copper salts may also be used.

It is not always essential to previously add the above-mentioned metal compound as such to the reaction system but, depending on the case, the element of the metal may be used while being converted into its chloride in the reaction system.

Among the foregoing metal compounds, aluminum compounds and iron compounds are preferable compounds since they can significantly enhance the selectivity to 3PNC coupled with the addition of pyridine or the like.

The polyvalent metal compound is used in a ratio more than 1/200 mol and, preferably, more than 1/100 mol per one mol of phosphorus pentachloride. If the amount of the polyvalent metal compound is lower than the above-specified range, no significant effect can be obtained and, on the other hand, an excessive amount will increase the rate of linear polymers.

Pyridine and Alkyl-substituted Derivatives Thereof

Pyridine or alkyl-substituted derivatives thereof, for example, α-picoline, β-picoline or γ-picoline, lutidine or methyl-ethyl-pyridine is used in the present invention. Particularly, when no pyridine nor its alkyl-substituted derivative is added to a system containing an aluminum or iron compound, a large amount of oligomers wherein n is 5 or above and a small amount of 3PNC are produced. On the contrary, when a small amount of pyridine or the like is added to the system, the 3PNC content of the obtained oligomer reaches 90% or above. Further, when a small amount of pyridine or the like is added to a system containing other polyvalent metal compounds, the yield of 3PNC can be enhanced and the reaction time can be reduced significantly. Accordingly, it can be presumed that pyridine or its alkyl-substituted derivative acts catalytically on the system together with. the polyvalent metal compound.

Pyridine or its alkyl-substituted derivatives may be used alone or in the form of a mixture of at least two of them in this invention.

The amount of pyridine or the alkyl-substituted derivatives thereof used herein is about more than 1/20 mol and, preferably, between 1/10-1 mol per one mol of phosphorus pentachloride.

If the amount of pyridine and the like is insufficient, no substantial effect can be obtained. On the other hand, if it is used excessively, the reaction temperature does not reach the desired temperature to reduce the yield of cyclic oligomers of phosphonitrile chloride and thus lower the yield of 3PNC.

Details for the action of pyridine and the alkyl-substituted derivatives thereof have not yet been analyzed at present. However, since the amount of pyridine or the alkyl-substituted derivatives thereof used in the present invention is extremely small, it is apparent that the action is different from that of an acceptor or catcher for hydrogen chloride generated as a by-product in the reaction of phosphorus pentachloride and ammonium chloride as described, for example, in "Gaisetsu Muki Kobunshi" (Outline for Inorganic Polymer) (p 69–71, written by Dr. Meisetsu Kajiwara, published by Chijin Shokan, on Apr. 10, 1978).

Embodiment of the Invention

According to the present invention, the reaction is carried out, for example, as below. A inert organic solvent, ammonium chloride, the above-mentioned polyvalent metal compound and pyridine or its alkyl-substituted derivative are charged in a reaction vessel, to which a solution of phosphorus pentachloride in an inert organic solvent is added dropwise under stirring and heating. Alternatively, instead of the solution of phosphorus pentachloride, a solution of phosphorus trichloride in an inert organic solvent may be added dropwise and gaseous chlorine may be introduced through a separate route at a rate corresponding to the dropping rate of the phosphorus trichloride solution.

The reaction temperature, although not particularly restricted, ranges usually from about 100° to 200° C. and, preferably, from about 120° to 145° C. If the reaction temperature is lower than the above-specified range, the reaction scarcely proceeds It is convenient to use such an inert organic solvent as having a boiling point within the above-defined temperature range and allow the reaction to proceed under the reflux of the solvent.

The reaction terminates at a point when the evolution of hydrogen chloride gas ceases. The reaction mixture is preferably aged further for about 2 hours at the same temperature. Then, the reaction mixture is cooled to room temperature and, after filtering out the excess ammonium chloride, the inert organic solvent is distilled off under reduced pressure whereby a phosphonitrile chloride oligomer mixture can be obtained generally at a high yield of more than 90% based on the amount of phosphorus pentachloride employed. The mixture contains more than 65% and, in most cases, more than 70% of 3PNC, while the rate of 4PNC in the mixture is at most not in excess of 10% and, usually, between 4–5%.

The present invention is more specifically described below by way of examples.

EXAMPLE 1

To a one liter four-necked flask equipped with a stirrer, a reflux condenser, a dropping funnel and a thermometer, were charged 300 g of monochlorobenzene, 38.6 g (0.72 mol) of ammonium chloride, 0.81 (9.9/1000 mol) of zinc oxide and 6.0 g (7.59/100 mol) of pyridine and, while stirring under heating, monochlorobenzene was refluxed to maintain a temperature at 125°–132° C. A solution of 125.0 g (0.6 mol) of phosphorus pentachloride dissolved in 300 g of monochlorobenzene was heated to 80°–100° C., and then dropped into the four-necked flask during a 5 hour period, followed by stirring under reflux for an additional 2 hours. Then, the content of the four-necked flask was cooled and the unreacted ammonium chloride was filtered out and the filtrate was subjected to distillation under reduced pressure to distill off monochlorobenzene to obtain 65.2 g of a phosphonitrile chloride oligomer mixture as the distillation residue [93.6% yield, which means here and hereinafter the yield of $(NPCl_2)_n$ relative to phosphorus pentachloride used assuming that all of the phosphonitrile chloride formed is $(NPCl_2)_n$]. Upon analysis with a gas liquid chromatography (hereinafter referred to as GLC), it was verified to be a phosphonitrile chloride oligomer mixture containing 73.9% of 3PNC and 3.7% of 4PNC.

Comparative Example 1

The experiment was carried out in the same manner as in Example 1 without using pyridine as used in Example 1. As the result, the amount of the phosphonitrile chloride oligomer mixture obtained was 66.4 g (95.4% yield). It was confirmed by GLC analysis that the mixture contained 44.5% of 3PNC and 16.9% of 4PNC.

EXAMPLE 2

The experiment was carried out in the same manner as in Example 1 except for increasing the amount of zinc oxide used in Example 1 to 1.35g (1.65/100 mol). A phosphonitrile chloride oligomer mixture was obtained in an amount of 65.6 g (93.9% yield), which contained 73.1% of 3PNC and 4.2% of 4PNC.

EXAMPLE 3

The experiment was carried out in the same manner as in Example 1 except for increasing the amount of pyridine used in Example 1 to 18.0 g (2.28/10 mol). A phosphonitrile chloride oligomer mixture was obtained in an amount of 65.7 g (94.4% yield), which contained 72.8% of 3PNC and 3.5% of 4PNC.

EXAMPLE 4

The experiment was carried out in the same manner as in Example 1 using 0.94 g (9.9/1000 mol) of anhydrous magnesium chloride instead of 0.81 g of zinc oxide used in Example 1. A phosphonitrile chloride oligomer mixture was obtained in an amount of 66.8 g (96.0% yield), which contained 80.2% of 3PNC and 5.0% of 4 PNC.

Comparative Example 2

The same experiment as in Example 4 was carried out without using pyridine used in Example 4. As the result, the amount of the reaction product obtained was 53.9 g (77.3%), which contained 53.5% of 3PNC and 15.3% of 4PNC.

EXAMPLES 5-7

The same experiment as in Example 1 was carried out using 1.29 g of cobalt chloride, 1.25 g of manganese chloride and 1.28 g of nickel chloride (each in 9.9/1000 mol) instead of 0.81 g of zinc oxide in Example 1. The results as shown in Table 1.

TABLE 1

| Example | Metal compound | Reaction product | | |
|---|---|---|---|---|
| | | Yield (%) | 3PNC content (%) | 4PNC content (%) |
| 5 | CoCl$_2$ | 93.6 | 71.8 | 3.5 |
| 6 | MnCl$_2$ | 93.8 | 70.6 | 4.5 |
| 7 | NiCl$_2$ | 95.4 | 71.1 | 3.7 |

Comparative Examples 3-5

The same experiments as those in Examples 5-7 were carried out without using pyridine unlike in Example 5-7. The results are shown in Table 2.

TABLE 2

| Comparative Example | Metal compound | Reaction product | | |
|---|---|---|---|---|
| | | Yield (%) | 3PNC content (%) | 4PNC content (%) |
| 3 | CoCl$_2$ | 94.3 | 60.1 | 19.7 |
| 4 | MnCl$_2$ | 95.1 | 59.6 | 18.4 |
| 5 | NiCl$_2$ | 93.8 | 52.0 | 16.7 |

EXAMPLE 8

The same experiment as in Example 1 was carried out using 6.0 g of mixed picoline (consisting of 0.5% α-picoline, 45.0% β-picoline, 29.3% γ-picoline and 25.2% 2,6-lutidine) instead of pyridine in Example 1. The amount of the reaction product obtained was 63.8 g (yield 91.7%), which contained 71.8% of 3PNC and 2.3% of 4PNC.

EXAMPLE 9

Using the same apparatus as in Example 1 and, while stirring a mixture of 300 g of monochlorobenzene, 38.6 g of ammonium chloride, 0.66 g (4.95/1000 mol) of anhydrous aluminum chloride and 6.0 g of pyridine, a solution of 125.0 g of phosphorus pentachloride dissolved in 300 g of monochlorobenzene and warmed to 80°-100° C. was dropped into the mixture. The temperature of the mixture at the start of the dropping was 133° C. and the lowest temperature of the mixture during dropping was 127.5° C. About 4 hours after the start of the dropping, evolution of hydrogen chloride gas became extremely vigorous. The dropping was completed by 7 hours and stirring was continued for a further 2 hours while keeping the temperature of the reacting mixture as it was (133° C.). In this experiment, the amount of phosphorus pentachloride sublimated from the reaction system and deposited to the wall of the reactor was significantly large as compared with the experiments described in Examples 1-8. The reaction mixture was treated in the same manner as in Example 1 to obtain 48.0 g of a phosphonitrile chloride oligomer mixture. The mixture contained 90.5% of 3PNC, 90% of 4PNC and 0.5% of other oligomers.

While the 48.0 g amount of the phosphonitrile chloride oligomer mixture obtained in this experiment corresponded to 69.0% yield based on the phosphorus pentachloride used in the reaction, it was considered that the yield was nearly 90% relative to phosphorus pentachloride actually consumed in the reaction since there was remarkable removal of phosphorus pentachloride from the reaction system through sublimation in this experiment.

EXAMPLE 10

The same experiment as in Example 9 was carried out while using 1.61 g (9.9 g/1000 mol) of anhydrous ferric chloride instead of 0.66 g of aluminum chloride in Example 9. Less phosphorus pentachloride sublimated during the experiment as compared with the case of using aluminum chloride. The weight of the phosphonitrile chloride oligomer mixture was obtained 63.0 g (90.5% yield), which contained 76.8% of 3PNC and 4.6% 4PNC.

Comparative Examples 6-7

The same experiment as those in Examples 9 and 10 were carried out without using pyridine used in these example. The results are shown in Table 3.

In Table 3, the yields are well over 100%. This is because the yields are calculated based on the assumption that all products are $(NPCl_2)_n$, though linear phosphonitrile chloride oligomers have the following composition:

$$[Cl_3P=N(PNCl_2)_n-PCl_3]\ominus[PCl_6]\oplus.$$

TABLE 3

| Comparative Example | Metal compound | Reaction product | | |
|---|---|---|---|---|
| | | Yield (%) | 3PNC content (%) | 4PNC content (%) |
| 6 | $AlCl_3$ | 109.4 | 22.9 | 5.3 |
| 7 | $FeCl_3$ | 106.5 | 26.1 | 7.9 |

What is claimed is:

1. A process for the preparation of phosphonitrile chloride oligomer which comprises reacting phosphorus pentachloride with ammonium chloride in the presence of a polyvalent metal compound catalyst in an inert organic solvent, characterized by the presence in the reaction system of a catalytic amount of a basic organic compound selected from the group consisting of pyridine and alkyl-substituted pyridine derivatives which can react with phosphorus pentachloride to form chloropyridinium salts.

2. The process as defined in claim 1, wherein ammonium chloride is used in an amount of 1.1-1.5 mol per one mol of phosphorus pentachloride.

3. The process as defined in claim 1, wherein the basic organic compound is a compound selected from the group consisting of pyridine, α-picoline, β-picoline, γ-picoline, lutidine and methyl-ethylpyridine.

4. The process as defined in claim 1, wherein the basic organic compound is present in an amount of 1/20-1 mol per one mol of phosphorus pentachloride.

5. The process as defined in claim 1, wherein the inert organic solvent comprises at least one member selected from the group consisting of tetrachloroethane, tetrachloroethylene monochlorobenzens, dichlorobenzene and nitrobenzene.

6. The process as defined in claim 1,, wherein the inert organic solvent is tetrachloethane or monochlorobenzene.

7. The process as defined in claim 1, wherein the inert organic solvent is used in an amount or 2-5 ml per one gram of phosphorus pentachloride.

8. The process as defined in claim 1, wherein the polyvalent metal compound is a compound of a metal selected from the group consisting of zinc, magnesium, tin, titanium, boron, aluminum, iron, cobalt, nickel, manganese, chromium, molybdenum and copper.

9. The process as defined in claim 1, wherein the polyvalent metal compound is a compound of aluminum or a compound of iron.

10. The process ad defined in claim 1, wherein the polyvalent metal compound is a compound selected from the group consisting of oxides, hydroxides, carbonates and organic acid salts that can be converted into chlorides with hydrogen chloride, chlorides, sulfates and nitrates.

11. The process as defined in claim 1,, wherein the polyvalent metal compound is used in an amount more than 1/200 mol per one mol of phosphorus pentachloride.

12. The process as defined in claim 1, wherein the polyvalent metal compound is used in an amount of more than 1/100 mol per one mol of phosphorus pentachloride.

* * * * *

UNITED STATES PATENT AND TRADEMARK OFFICE
CERTIFICATE OF CORRECTION

PATENT NO. : 4,567,028
DATED : January 28, 1986
INVENTOR(S) : Hiroshi TANINO et al It is certified that error appears in the above-identified patent and that said Letters Patent is hereby corrected as shown below:

In column 2, line 21, change "phosphorrus" to
-- phosphorus--

In column 4, line 22, change "proceeds" to --proceeds.--

In column 8, line 9, change "chloroethylene" to
-- chloroethylene,--

Signed and Sealed this

Fifteenth Day of July 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,567,028
DATED : January 28, 1986
INVENTOR(S) : Hiroshi TANINO et al It is certified that error appears in the above-identified patent and that said Letters Patent is hereby corrected as shown below:

In column 8, line 9, change "monochlorobenzens," to -- monochlorobenzene, --

Signed and Sealed this

Twenty-eighth Day of October, 1986

[SEAL]

Attest:

DONALD J. QUIGG

*Attesting Officer*  *Commissioner of Patents and Trademarks*